W. P. PENN.
Seed Planter.

No. { 125, 31,129. }

Patented Jan. 15, 1861.

Inventor
Worden P Penn
By his Attorney
Amos P Brownay

UNITED STATES PATENT OFFICE.

WORDEN P. PENN, OF BELLEVILLE, ILLINOIS.

IMPROVEMENT IN SEEDING-PLOWS.

Specification forming part of Letters Patent No. 31,129, dated January 15, 1861.

*To all whom it may concern:*

Be it known that I, WORDEN P. PENN, of Belleville, in the county of St. Clair, in the State of Illinois, have invented a new and Improved Seed-Plow; and I do hereby declare that the following is a full, clear, and exact description of the same, reference being had to the annexed drawings, making part of this specification, in which—

Figure 1:
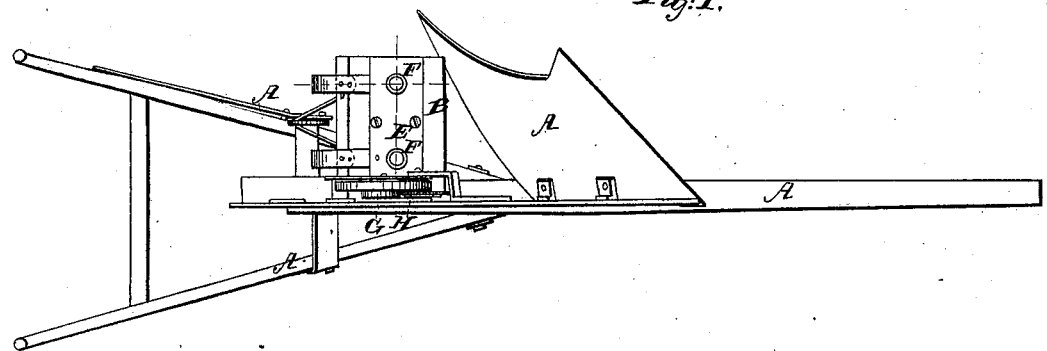
Figure 2:
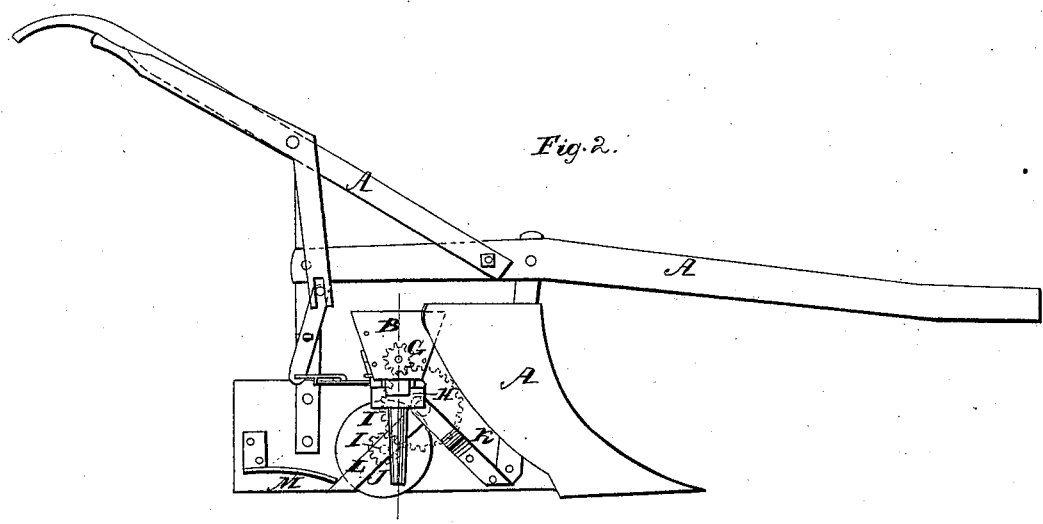
Figure 3:
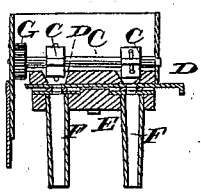
Figure 4:
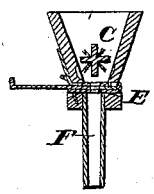

Figure 1 is a top view of my said improved seed-plow turned upside down; Fig. 2, a side elevation thereof; and Figs. 3 and 4 are respectively vertical, longitudinal, and transverse sections through the hopper-box of the said plow.

To enable any one skilled in the arts to which my invention appertains to make and use my invention, I will proceed to describe the construction and operation thereof.

Similar letters of reference represent corresponding parts of the different figures of the drawings annexed.

In the drawings, A represents an ordinary plow, behind the mold-board of which and against the landside thereof I fix a hopper-box, B, in which I arrange a revolving feeder, C, over the holes D in the bottom of the hopper-box. Under the bottom of the hopper-box I fix a second bottom piece, E. Between these two bottom pieces I fix, or rather arrange, the valves for regulating the flow of the seed from the hopper. These valves are of the ordinary reciprocating kind, and are operated in any convenient way. In the bottom piece, E, is fixed the drill-tubes F, as shown. On the end of the revolving feeder C, I fix a small pinion-wheel, G, into which the wheel H meshes, to which motion is conveyed by the pinion I, which pinion is fixed upon the shaft of the driving-wheel J. The wheel H is fixed in a bracket, K, bolted to the landside, and on the center of the said wheel the bracket L is hung, so that the pinion I can move around the periphery of the wheel H and remain in gear in any and all positions, the intention being to allow the bracket L to hang loose upon the center of the wheel H, so that the wheel J can ride or travel upon the ground, and thus give motion to the other wheels, the said wheel J being pressed upon the ground by means of the spring M, which bears upon the bracket L.

I design this machine to deposit the grain in drills or to sow it broadcast in the newly-made furrow. When it is used to drill the seed it is made as shown and described; but when it is to be used to sow broadcast the lower bottom piece is to be taken away and a different style of valve put in, so as throw the seed broadcast in the bottom of the furrow.

Having thus described the construction and operation of my invention, what I claim, and desire to secure by Letters Patent, is—

The described arrangement of wheels J and H, hopper-box B, and spring M behind the mold-board A and against the landside of the plow, for the purpose of sowing broadcast or drilling the seed in the bottom of the furrow, the whole to be made, operated, and arranged substantially in the manner described.

W. P. PENN.

Witnesses:
   G. A. HARVEY,
   F. D. BELCOUR.